No. 784,528. PATENTED MAR. 14, 1905.
T. P. AMBROSE.
FOUNTAIN PEN.
APPLICATION FILED DEC. 24, 1903.
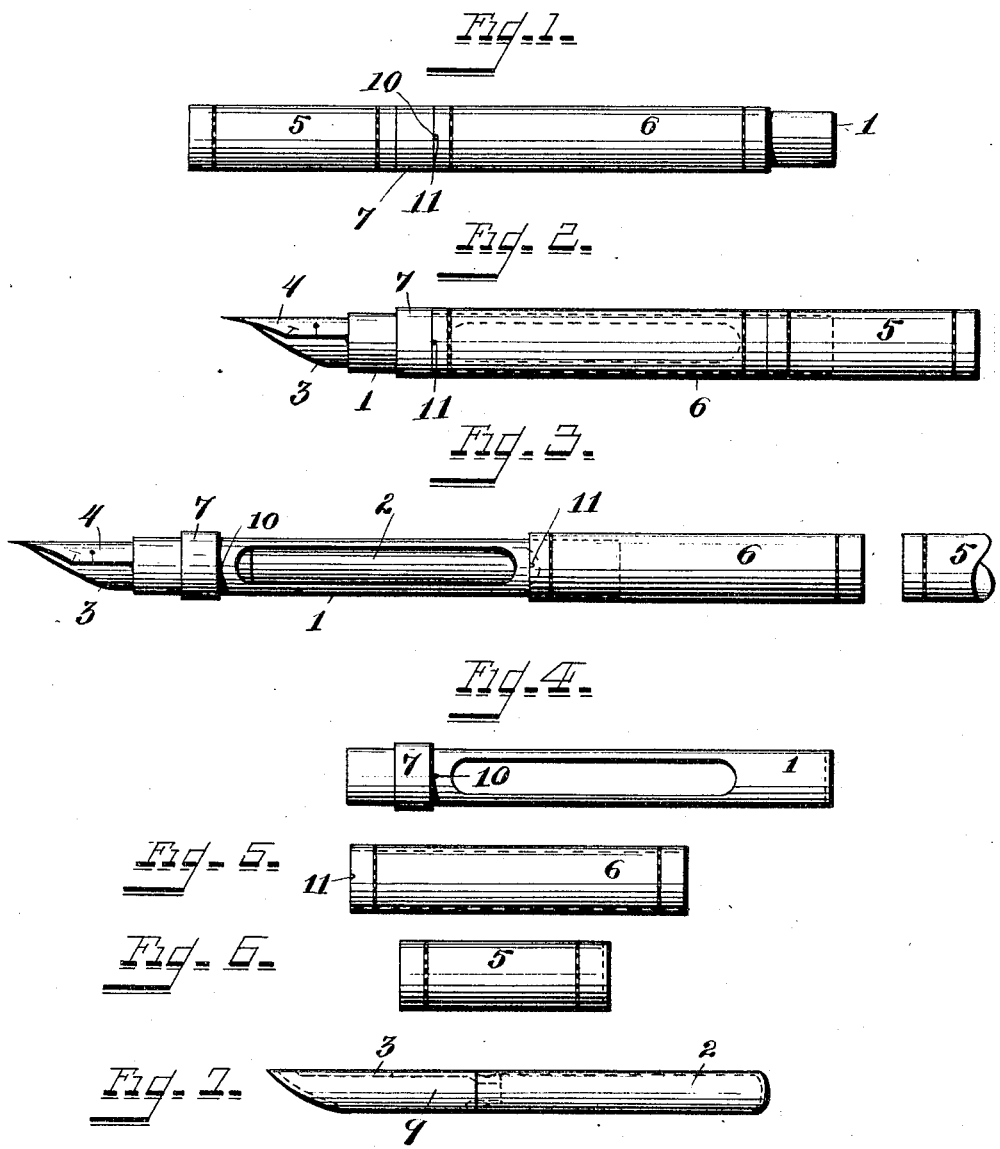

No. 784,528. Patented March 14, 1905.

UNITED STATES PATENT OFFICE.

THOMAS P. AMBROSE, OF CINCINNATI, OHIO.

FOUNTAIN-PEN.

SPECIFICATION forming part of Letters Patent No. 784,528, dated March 14, 1905.

Application filed December 24, 1903. Serial No. 186,464.

*To all whom it may concern:*

Be it known that I, THOMAS P. AMBROSE, a citizen of the United States, residing at Cincinnati, in the county of Hamilton and State of Ohio, have invented certain new and useful Improvements in Fountain-Pens, of which the following is a specification.

My invention relates to improvements in that class of fountain-pens in which the fountain is an india-rubber or other flexible elastic tube.

The object of my invention is to produce a simple, convenient, economical, and durable fountain-pen provided with an ink-reservoir which can be easily filled without removing it from the frame or pen-feed to which it is attached.

My invention consists in providing a holder with a flexible ink-reservoir held within a frame having open sides and adapted to be covered by a sleeve.

My invention also consists in the parts and combination and arrangement of parts, as herein described and as particularly pointed out in the claim.

In the drawings which serve to illustrate my invention, Figure 1 is a side elevation showing the parts assembled in position to carry in the pocket. Fig. 2 is a side elevation showing the cap removed from over the pen-point and placed upon the opposite end of the holder. Fig. 3 is a side elevation showing the sleeve moved from its normal position to expose the flexible reservoir. Fig. 4 is a side elevation of the frame which incases the reservoir and carries the sleeve. Fig. 5 is a side elevation of the sleeve. Fig. 6 is a side elevation of the cap. Fig. 7 is a side elevation of the pen-feed and flexible ink-reservoir attached thereto.

My improved device is preferably constructed substantially as follows: The slotted frame 1, as shown in Fig. 4, is cylindrical in shape and is adapted to receive and hold the flexible ink-reservoir 2, pen-feed 3, and pen-point 4, as shown in Fig. 3, and to be incased in the cap 5 and sleeve 6, as shown in Fig. 1. An annular boss or band 7 is formed on the sleeve between one end and the slotted portion to form a stop for the cap and sleeve and to produce a uniform surface for the holder. The pen-feed 3 and ink-reservoir 2 are secured together by frictional contact and they are likewise held in the frame 1 in the same manner. The pen-point 4 is supported in its place in any desired manner, fitting between the wall of the frame and the pen-feed. The pen-feed 3 is preferably formed with a large cavity 9, as shown by dotted lines, but may be provided with a small passage for the ink, as desired. By having a large cavity there is less danger of clogging than otherwise. The pen-feed and ink-reservoir may be permanently or removably secured within the frame. I prefer to secure them permanently. When it is desired to fill the ink-reservoir, simply insert the pen into the ink-bottle or other receptacle and compress the elastic reservoir between the thumb and finger and release same. This will produce the necessary suction and accomplish the desired result. Then slip the sleeve into position on the frame as shown in Fig. 2, and the pen is ready for use. The cap may be carried as shown in Fig. 2 when writing and at other times as shown in Fig. 1. It will thus be seen that by my improved device I am enabled to reink the reservoir easily and quickly by merely shifting the sleeve, as shown in Fig. 3, compressing the bulb, and then readjusting the sleeve to the position shown in Fig. 2. In order to hold the sleeve from accidentally slipping out of place, I provide a stud 10 upon the frame and a recess 11 upon the sleeve, so that when the sleeve is adjusted into position the stud will be forced into the recess, and thereby hold the sleeve from rotary movement on the frame. I construct the sleeve of shorter length than the frame, so that the cap may be held in the position shown in Fig. 2 when the pen is being used.

I claim—

As a new and improved article of manufacture, a fountain-pen consisting of the slotted tubular frame 1 provided with the boss 7 and the stud 10, the flexible ink-reservoir 2 having the pen-feed 3 secured in said frame, the recessed sleeve 6 adjustably secured on said frame, covering the slots in said tubular frame and said ink-reservoir and engaging said stud, and the cap 5, all combined in the manner and for the purposes specified.

THOMAS P. AMBROSE.

Witnesses:
JAMES N. RAMSEY,
FLORENCE M. POWER.